US012703293B2

(12) United States Patent
Dolezel

(10) Patent No.: US 12,703,293 B2
(45) Date of Patent: Aug. 11, 2026

(54) LIGHTING ACCESSORY MOUNTED TO A MATERIAL HANDLING VEHICLE HAVING A SELECTIVELY ACTIVATED LIGHT SOURCE BASED ON SENSED DATA

(71) Applicant: The Raymond Corporation, Greene, NY (US)

(72) Inventor: Keith F. Dolezel, Franklin, NY (US)

(73) Assignee: The Raymond Corporation, Greene, NY (US)

(*) Notice: Subject to any disclaimer, the term of this patent is extended or adjusted under 35 U.S.C. 154(b) by 0 days.

(21) Appl. No.: 19/094,345

(22) Filed: Mar. 28, 2025

(65) Prior Publication Data

US 2025/0303955 A1 Oct. 2, 2025

Related U.S. Application Data

(60) Provisional application No. 63/571,712, filed on Mar. 29, 2024.

(51) Int. Cl.
*B60Q 1/00* (2006.01)

(52) U.S. Cl.
CPC ........ *B60Q 1/0023* (2013.01); *B60Q 2800/20* (2022.05)

(58) Field of Classification Search
CPC .. B60Q 2800/20; B60Q 2900/10; B60Q 1/24; B60Q 1/245; B60Q 1/247; B60Q 1/249; B60Q 1/0023; B66F 17/003; B66F 2700/00; B66F 2700/025; B66F 2700/03; B66F 2700/04; B66F 2700/05; B66F 2700/052; B66F 2700/055; B66F 2700/057; B66F 2700/07; B66F 2700/09; B66F 2700/12; B66F 2700/123; B66F 2700/126
See application file for complete search history.

(56) References Cited

U.S. PATENT DOCUMENTS 4,224,657 A * 9/1980 Olson .................. B66F 9/0755
362/481
9,607,496 B2 3/2017 Beggs et al.
(Continued)

FOREIGN PATENT DOCUMENTS

CN 209922824 U 1/2020
CN 218465432 U 2/2023
(Continued)

OTHER PUBLICATIONS

European Patent Office, Application No. 25167104.6, Extended European Search Report, Sep. 1, 2025, 9 pages.

*Primary Examiner* — Robert J May
(74) *Attorney, Agent, or Firm* — Quarles & Brady LLP

(57) ABSTRACT

A lighting accessory for a material handling vehicle may be provided. The lighting accessory may include a housing, a light source disposed within the housing, a window in the housing configured to allow light from the light source to illuminate a working area adjacent to the material handling vehicle, and a controller configured to selectively activate the light source based on data collected by a sensor. Light emitted from the light source may be projected substantially parallel to a ground plane. The housing may be configured to be coupled to a rotatable arm or a body of the material handling vehicle within or around an operator compartment of the material handling vehicle.

18 Claims, 10 Drawing Sheets

(56) References Cited

U.S. PATENT DOCUMENTS

| | | | |
|---|---|---|---|
| 9,802,528 B2 | 10/2017 | Adami | |
| 10,106,072 B2 * | 10/2018 | Liñan | B60Q 1/085 |
| 2016/0200240 A1 | 7/2016 | Quinlan et al. | |
| 2017/0275145 A1 | 9/2017 | Laker | |

FOREIGN PATENT DOCUMENTS

| | | |
|---|---|---|
| JP | S55106830 A | 8/1980 |
| KR | 20170014089 A | 2/2017 |

* cited by examiner

S200

S204
Providing a material handling vehicle including a lighting accessory coupled to a rotatable arm or body of the material handling vehicle S206
Determining using a sensor, one or more parameters, including a position of the rotatable arm, a speed of the material handling vehicle, a location of the material handling vehicle within a facility, a level of ambient light in the surrounding environment, and/or a motion of an operator of the material handling vehicle or of objects in the vicinity of the material handling vehicle S208
Based on the determination of the parameters made by the sensor, activating or adjusting the light source of the lighting accessory by adjusting one or more of a brightness, a beam angle, a color, a flicker frequency, and other applicable settings of the lighting accessory

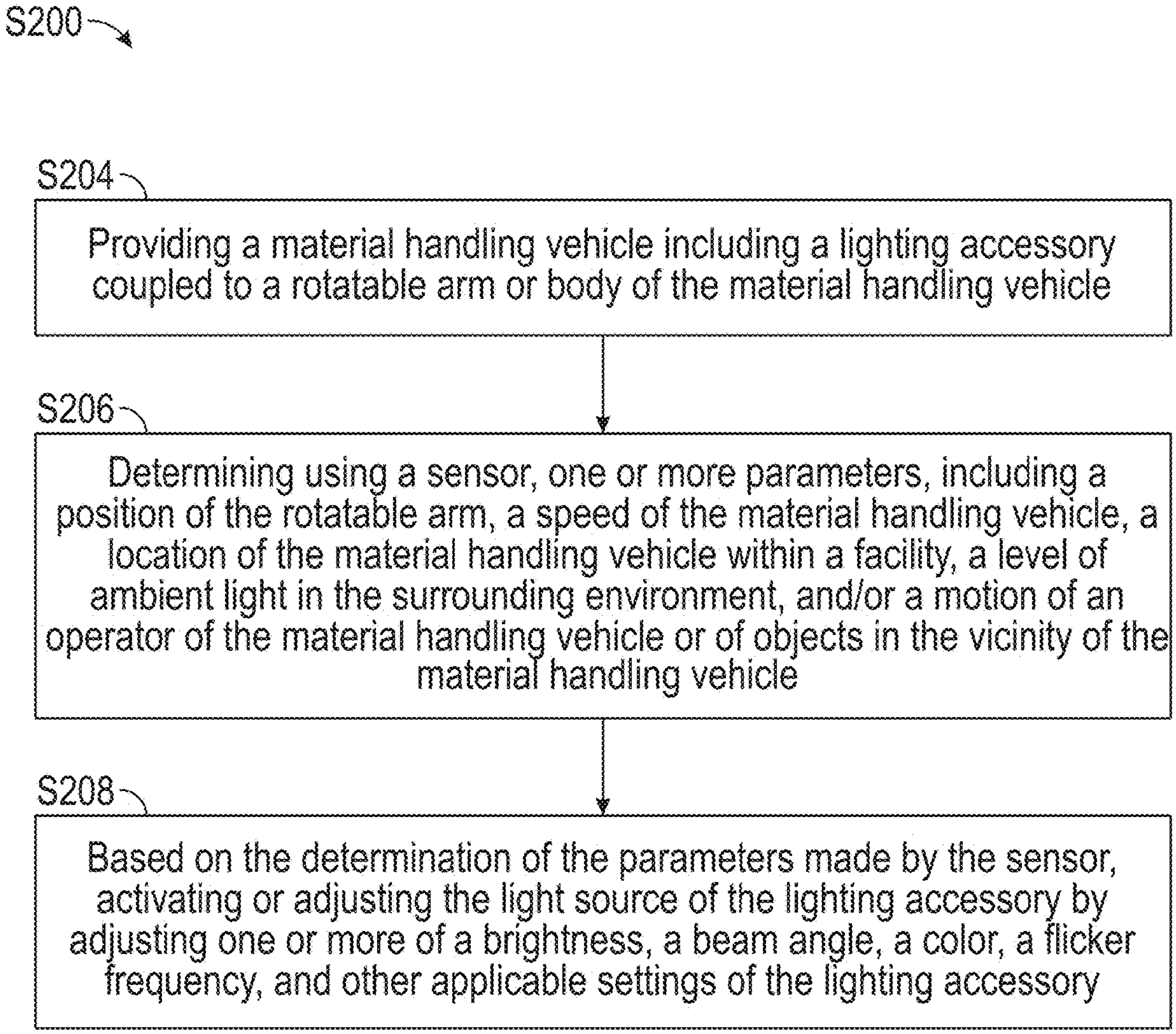

FIG. 10

LIGHTING ACCESSORY MOUNTED TO A MATERIAL HANDLING VEHICLE HAVING A SELECTIVELY ACTIVATED LIGHT SOURCE BASED ON SENSED DATA

CROSS-REFERENCE TO RELATED APPLICATIONS

This application is based on and claims priority to U.S. Provisional Patent Application No. 63/571,712 filed on Mar. 29, 2024, the entire disclosure of which is incorporated herein by reference.

BACKGROUND

Material handling vehicles can be found in warehouses, factories, shipping yards, and, generally, wherever pallets, large packages, or loads of goods are transported from place to place. Material handling vehicles may be designed to include one or more sources of illumination to assist in loading and unloading packages or pallets, but traditional illumination devices may not be effective in all applications.

BRIEF SUMMARY

Embodiments of the present disclosure provides a lighting accessory for a material handling vehicle that may include one or more integral sensors and/or cameras.

According to an aspect of the present disclosure, a lighting accessory for a material handling vehicle may be provided. The lighting accessory may include a housing. A light source may be disposed within the housing. A window in the housing may be configured to allow light from the light source to illuminate a working area adjacent to the material handling vehicle. A controller may be configured to selectively activate the light source based on data collected by a sensor. Light emitted from the light source may be projected substantially parallel to a ground plane. The housing may be configured to be coupled to a rotatable arm or a body of the material handling vehicle within or around an operator compartment of the material handling vehicle.

According to another aspect of the present disclosure, a material handling vehicle may be provided. The material handling vehicle may include a body. An operator compartment may be included. A rotatable arm may extend at least partially around the operator compartment. A lighting accessory may be coupled to the body or rotatable arm. The lighting accessory may include a light source configured to emit light substantially parallel to a ground plane. A sensor may be included. A controller may be configured to selectively activate the light source based on data collected by the sensor.

According to a further aspect of the present disclosure, a method of operating a lighting accessory for a material handling vehicle may be provided. The method may include providing the material handling vehicle including a rotatable arm, the lighting accessory coupled the rotatable arm. The method may include determining, using a sensor, a position of the rotatable arm of the material handling vehicle. The method may include selectively activating a light source of the lighting accessory based on the determined position of the rotatable arm.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

FIG. 10 is a method of using a lighting accessory for a material handling vehicle, according to aspects of the present disclosure.

DETAILED DESCRIPTION

Figure 1:
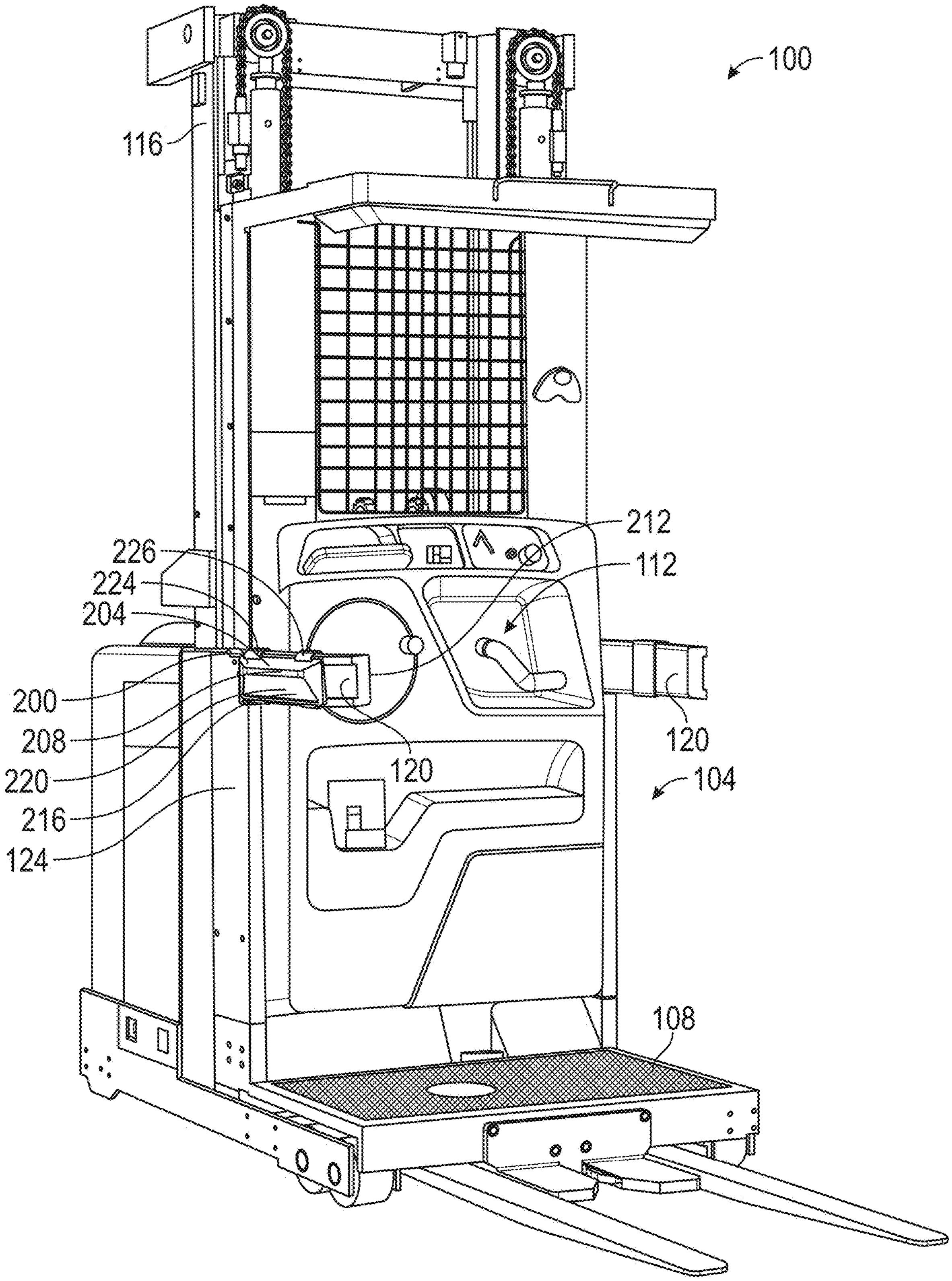
FIG. 1 is a perspective view of a material handling vehicle (MHV), according to aspects of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

Also as used herein, unless otherwise specified or limited, directional terms are presented only with regard to the particular embodiment and perspective described. For example, reference to features or directions as “horizontal,” “vertical,” “front,” “rear,” “left,” “right,” and are generally made with reference to a particular figure or example and are not necessarily indicative of an absolute orientation or direction. However, relative directional terms for a particular embodiment may generally apply to alternative orientations of that embodiment. For example, “front” and “rear” directions or features (or “right” and “left” directions or features, and so on) may be generally understood to indicate relatively opposite directions or features.

Unless otherwise limited or defined, "substantially parallel" indicates a direction that is within plus or minus 12 degrees of a reference direction (e.g., within plus or minus 6 degrees or plus or minus 3 degrees), inclusive. Correspondingly, "substantially vertical" indicates a direction that is substantially parallel to the vertical direction, as defined relative to gravity, with a similarly derived meaning for "substantially horizontal" (relative to the horizontal direction). Likewise, unless otherwise limited or defined, "substantially perpendicular" indicates a direction that is within plus or minus 12 degrees of perpendicular a reference direction (e.g., within plus or minus 6 degrees or plus or minus 3 degrees), inclusive.

It is also to be appreciated that material handling vehicles (MHVs) are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the present disclosure is not limited to material handling vehicles applications. Rather, the present disclosure may be provided for other types of vehicles, such as automobiles, buses, trains, tractor-trailers, farm vehicles, factory vehicles, and the like.

The invention will now be described more specifically with reference to the following embodiments. It is to be noted that the following embodiments are presented herein for purpose of illustration and description only. It is not intended to be exhaustive or to be limited to the precise form disclosed.

As should be noted, for certain types of vehicles there are training requirements imposed by various government agencies, laws, rules, and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

Operators utilizing material handling vehicles (MHVs) to retrieve orders often face challenges related to visibility and low lighting within their working area. Traditional material handling vehicles typically include overhead lights; however, these overhead lights may not completely illuminate the working area on either side of the MHV (e.g., beyond an operator compartment of the MHV). As such, operators attempting to pick goods from pick locations often operate under low visibility conditions, potentially causing the operators to spend additional time identifying the specific goods to be picked, ultimately reducing efficiency and leading to slower order fulfillment and increased labor costs. It may accordingly be beneficial to provide different sources of illumination, to increase visibility in the operator's working area.

Correspondingly, embodiments of the invention can provide a lighting accessory that can enhance visibility in the order picker's working area by projecting light sideways from the MHV, reducing shadows and providing more uniform lighting across shelves and storage areas. Examples of the present invention may accordingly save time and cost by providing clearer illumination of pick locations, which allows order pickers to more easily identify and retrieve goods and improve the speed and accuracy of order picking tasks. Some examples of the lighting accessory can be beneficially used with order picking MHVs, however, there is a benefit for all MHVs to incorporate a lighting accessory that projects light to illuminate working areas on either side of the MHV.

Generally, embodiments of the present invention include a lighting accessory that is coupled to an MHV. Specifically, the lighting accessory may be fastened to or integrated with a body or a rotatable arm of the MHV. The lighting accessory can include a housing, which includes a window that can be at least partially transparent. The window can allow light emitted from a light source within the housing to be transmitted from the housing to the environment surrounding the MHV. The light source can illuminate a working area of an operator of the MHV to a left and right side of the MHV.

In some implementations, the lighting accessory may include a controller that manages the operation of the light source based on data collected by one or more sensors. The controller may activate, deactivate, or adjust the light source in response to various environmental and operational factors. For example, the controller may selectively control the light source based on the position of the rotatable arm, as detected by a position sensor. The controller may also adjust settings of the light source according to a speed of the material handling vehicle, a location of the material handling vehicle, a level of ambient light, and a motion of an operator of the material handling vehicle or of objects in an environment of the material handling vehicle.

By integrating these sensor inputs, the controller may optimize the functionality of the lighting accessory, providing appropriate illumination for various operational scenarios and enhancing the efficiency of material handling tasks. The adaptive nature of this system may allow for more nuanced and context-aware lighting solutions in diverse warehouse and industrial environments.

In some cases, a material handling vehicle 100 (MHV) may include various components designed for order picking operations. As illustrated in FIG. 1, the MHV 100 can include a pair of forks that allow the MHV 100 to pick up and transport goods around a warehouse. Furthermore, as described below, the MHV 100 may be designed to lift an operator to pick locations that would otherwise be beyond the reach of the operator.

The MHV 100 can include an operator compartment 104. During operation of the MHV 100, the operator compartment 104 can house the operator. For example, the operator can stand on a platform 108 located within the operator compartment 104, or otherwise sit on a seat or other device located on the platform 108. The operator can control functions of the MHV 100 from within the operator compartment 104 by interaction with a MHV user interface 112.

The MHV user interface 112 may include various controls and displays that allow the operator to control the MHV 100 and perform order picking tasks. Specifically, the operator may control functions such as the speed and direction of the MHV 100 via the MHV user interface 112. The MHV user interface 112 may further allow the operator to control extension and retraction of a mast 116 of the MHV 100. The mast 116 may enable vertical movement of the operator compartment 104. Specifically, extending the mast 116 may raise the operator compartment 104 and the operator therein to a pick location, to allow the operator to retrieve goods from the pick location, such as a shelf or other applicable storage location in a warehouse or elsewhere.

As illustrated in FIG. 1, the MHV 100 can include picker arms 120. The picker arms 120 may extend at least partially around the operator compartment 104 and may aid in stabilizing the operator during movement (e.g., forward, upward, or otherwise). Specifically, the picker arms 120 can be coupled to and rotatable relative to a body 124 (e.g., a vehicle body) of the MHV 100. As described further below, the picker arms 120 can include a lighting accessory that may be configured to illuminate a pick location and increase visibility across shelves and other storage areas for the operator.

In some examples, the material handling vehicle 100 may include a lighting accessory 200. The lighting accessory 200 may be configured to enhance visibility in the operator's working area by projecting light sideways from the material handling vehicle 100 onto the operator's working area. As illustrated in FIG. 1, the lighting accessory 200 can be fastened to the picker arm 120, however, as described further below, a lighting accessory may instead be integrated with the picker arm 120 or otherwise integrated with or fastened to another portion of the MHV 100, such as the body 124.

The lighting accessory 200 may include a housing 204. The housing 204 can include a plurality of sidewalls. Specifically, the housing 204 can include at least a first sidewall 208 and a second sidewall 212 disposed opposite the first sidewall 208. As illustrated in FIG. 1, the first sidewall 208 may contact the picker arm 120, and the second sidewall 212 may face away from the picker arm 120. As described further below, the second sidewall 212 may be angled obliquely relative to the first sidewall 208 to optimize light distribution through a window disposed in the second sidewall 212. The housing 204 may be designed to protect internal components of the lighting accessory 200, such as a light source 216, from environmental factors such as dust, moisture, or impact. The housing 204 may be constructed from various materials, such as plastic, metal, composite, or other applicable materials.

The light source 216 within the housing may be configured to provide illumination for the operator's working area. In some cases, the light source 216 may include LED lights, halogen bulbs, or other suitable lighting technologies. As described further below, the light source 216 may be turned on and off or otherwise adjusted based on a position of the picker arm 120, a location of the MHV 100, or other applicable factors.

In some cases, the housing 204 may include one or more windows 220. The windows 220 may be at least partially translucent or transparent to allow the light source 216 within the housing 204 to transmit light through the windows 220. As illustrated in FIG. 1, the windows 220 can be disposed in the second sidewall 212, such that the windows 220 face away from the picker arm 120. The windows 220 can be a trapezoidal shape, and may extend across most of the second sidewall 212, however, in other examples, the shape, size, location, and number of the windows 220 may vary depending on the desired light output and coverage area. The windows 220 may be made of materials such as tempered glass, polycarbonate, plastic, or other durable, light-transmitting materials.

In some embodiments, aside from the windows 220, the housing 204 may be opaque. For example, the first sidewall 208 and portions of the second sidewall 212 may be opaque. In some examples, the opaque portions of the housing 204 may help focus and direct the light emitted by the light source 216 through the windows 220. Furthermore, the internal surfaces of the housing 204 may include reflective materials or coatings. These reflective surfaces may redirect light that would otherwise be absorbed or scattered within the housing 204, concentrating more of the light output towards the windows 220. In some implementations, the reflective material may be applied to strategic areas of the internal walls to shape the light distribution pattern emerging from the windows 220. This approach may allow for customization of the lighting pattern to suit different working environments or specific illumination requirements. The combination of the opaque portions of the housing 204 and the reflective internal surfaces may result in a more controlled and directed light output, reducing light spillage in unwanted directions and maximizing the amount of useful illumination provided to the operator's working area.

As illustrated in FIG. 1, the lighting accessory 200 may be coupled to one of the picker arms 120 using a fastener 224. In some examples, the fastener 224 may extend from the first sidewall 208. However, the fastener 224 may instead extend from sidewalls of the housing 204 that connect the first and second sidewalls 208, 212. In some examples, the fastener 224 may allow the operator to remove the lighting accessory 200 from the picker arm 120. For example, the fastener 224 can include straps 226. The straps 226 may be looped around and tightened around the picker arm 120 (see also FIG. 8). The straps 226 may be adjustable to allow the fastener 224 to secure the lighting accessory to various sizes and configurations of the picker arm 120. The fastener 224 that utilizes the straps 226 may also be quickly removable. For example, the straps 226 may include hook and loop fasteners, snap fasteners, buckles, magnets, clips, hook-and-eye closures, or other applicable openable closure mechanisms. In some examples, the fastener 224 may include one or more gimbles to allow the operator to rotate the lighting accessory 200 to focus the light from the light source 216 at a particular location of their working area. In other examples, the fastener 224 may be otherwise coupled to the picker arm 120 using bolts, a bracket, screws, interlocking rail systems, adhesive, collars, or other applicable fastening mechanisms.

Figure 2:
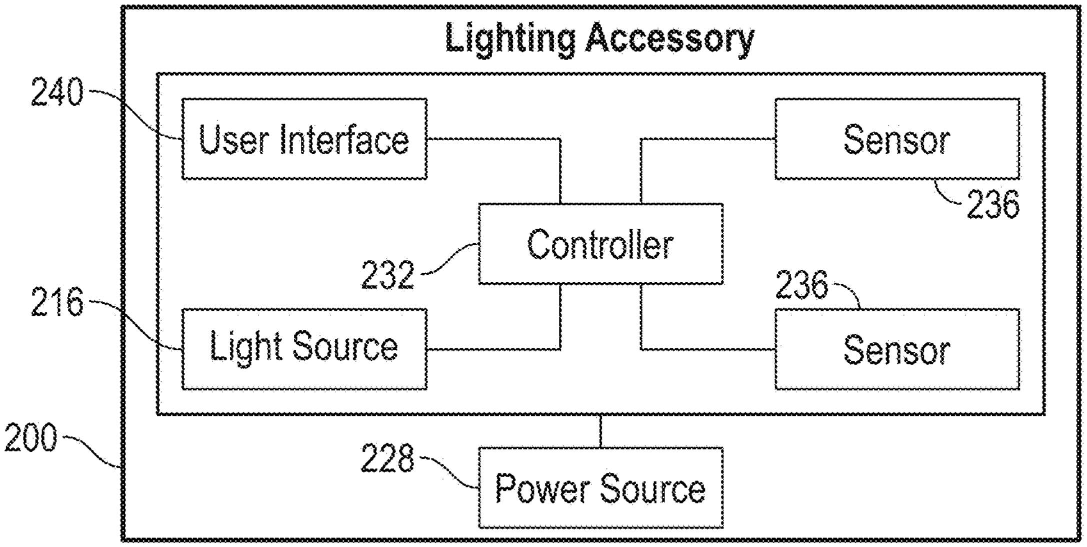
FIG. 2 is a schematic diagram of the MHV of FIG. 1.

Referring to FIG. 2, the lighting accessory 200 may further include a power source 228 that supplies power to the light source 216. The power source 228 may be a power source of the MHV 100 (e.g., a battery, engine, or alternator thereof). Specifically, the power source 228 may be electrically coupled to the MHV 100 to receive power therefrom. In other examples, the lighting accessory 200 may be powered independently of the MHV 100. For example, the lighting accessory 200 may include a discreet power source, such as batteries, independent of the MHV 100. In another example, the lighting accessory 200 may include both a discreet power source and may be electrically coupled to the MHV 100. In such examples, the discreet power source may be charged by the power source of the MHV 100.

Still referring to FIG. 2, operation of the light source 216 may be controlled by a controller 232. Specifically, the controller 232 may be configured to selectively turn the light source 216 on and off and otherwise adjust settings of the light source by selectively providing power to the light source 216. In some examples, the controller 232 may be connected to one or more sensors 236. As described further below, the sensors 236 may provide data to the controller 232. The controller 232 can ingest the data provided from the sensors 236 to determine when to turn the light source 216 on and off or to otherwise determine when and how to adjust settings of the light source 216.

In some examples, the lighting accessory 200 may include a user interface 240. The user interface 240 may be connected to the controller 232. The user interface 240 may allow the operator to directly control the operation of the light source 216. For instance, operator interaction with the user interface 240 may cause the controller 232 to turn the light source on and off or otherwise adjust setting of the light source 216. The user interface 240 may include various input mechanisms such as buttons, switches, or touchscreens that allow the operator to switch the lighting accessory 200 between various modes such on, off, strobe, and auto. The user interface 240 may also include a display that provides information about the current status of the lighting accessory 200, such as whether it is powered on, the current brightness level, or any error conditions. In some cases, the display may be an LCD screen or LED indicators that visually communicate the operational state of the lighting accessory 200 to the operator.

Additionally, the user interface 240 may incorporate other control elements such as dials, sliders, or digital inputs that allow the operator to adjust various parameters of the lighting accessory 200. These parameters may include light intensity, color temperature, or beam angle. In some implementations, the user interface 240 may be integrated with the MHV user interface 112, providing a seamless operational experience for the operator. This integration may allow the operator to control the lighting accessory 200 without removing their hands from the MHV user interface 112, enhancing efficiency during operation.

As described above, the controller 232 can control the light source 216 based off of data supplied by the one or more sensors 236. For example, when the lighting accessory 200 is in "auto" mode, the controller 232 may be able to control the light source 216 without operator input. In "auto" mode, the controller 232 may be able to adjust various setting of the light source 216 including color, brightness, flicker frequency, beam angle of the light source 216, and other applicable settings.

In some examples, the sensors 236 may include position sensors that detect a position of the picker arm 120. For example, as described further below, the sensors 236 may determine a rotational position of the picker arm 120. As described below, the controller 232 may adjust settings of the light source 216 depending on the position of the picker arm 120.

In some examples, the sensors 236 may include position sensors that detect a position of the operator compartment 104 or the mast 116. For example, the sensors 236 may determine the extension or retraction of the mast 116. The controller 232 may use this data to determine when the operator compartment 104 is extended to a pick location. In such examples, the controller 232 may adjust settings of the light source 216 when the mast 116 extends the operator compartment 104 upward or otherwise toward a pick location.

In some examples, the sensors 236 may include position sensors that detect a position of the MHV 100 within a warehouse. The sensors 236 may utilize technologies such as GPS, indoor positioning systems, or RFID readers to determine the location of the MHV 100. The controller 232 may use this positional data to adjust settings of the light source 216 when the MHV 100 enters specific areas of the warehouse that require additional illumination. For example, the controller 232 may activate the light source 216 to strobe or flash when the MHV 100 exits or enters an aisle, to signal a position of the MHV 100 to other workers in the warehouse. In other examples, the controller 232 may use the positional data to adjust settings of the light source 216 when the MHV 100 is approaching or is near a pick location of a desired good.

In some examples, the sensors 236 may include speed sensors. The sensors 236 may measure the speed of the MHV 100 or the rate of movement of the picker arm 120. The controller 232 may adjust settings of the light source 216 based on the detected speed, potentially decreasing illumination intensity during faster movements and increasing illumination intensity when the MHV 100 is moving slowly or is stationary (and vice versa). The controller 232 may further adjust settings of the light source 216, by strobing the light source 216 (e.g., altering the flicker frequency), while the MHV 100 is moving around the warehouse.

In some examples, the sensors 236 may include ambient light sensors. The sensors 236 may be configured to measure the surrounding light levels. Utilizing the data from the sensors 236 the controller 232 can adjust settings of the light source 216 based on the existing lighting conditions in the warehouse, optimizing visibility while conserving energy. For example, the controller 232 may increase an intensity of the light source 216 in darker areas and decrease intensity of the light source 216 in brighter areas.

In some implementations, the sensors 236 may include cameras. The sensors 236 may capture images or video of the surrounding area. Furthermore, the controller 232 may analyze the images or video to identify pick locations, operators, obstacles, or other relevant features. The controller 232 may adjust settings of the light source 216 based on the visual data collected by the cameras.

In some examples, the sensors 236 may include movement sensors. The sensors 236 may detect operator movement. The sensors 236 may utilize infrared or ultrasonic detection (or other applicable detection technology) to sense when an operator is reaching for items or moving within the operator compartment 104. The controller 232 may use this data to adjust settings of the light source 216 in response to specific operator movements.

Other types of sensors 236 that may be incorporated include proximity sensors to detect nearby objects or shelving, tilt sensors to measure the inclination of the MHV 100 or the picker arm 120, and load sensors to detect when items are placed on or removed from the MHV 100. The controller 232 may ingest data from the sensors 236 to adjust settings of the lighting accessory 200 accordingly.

Figure 3:
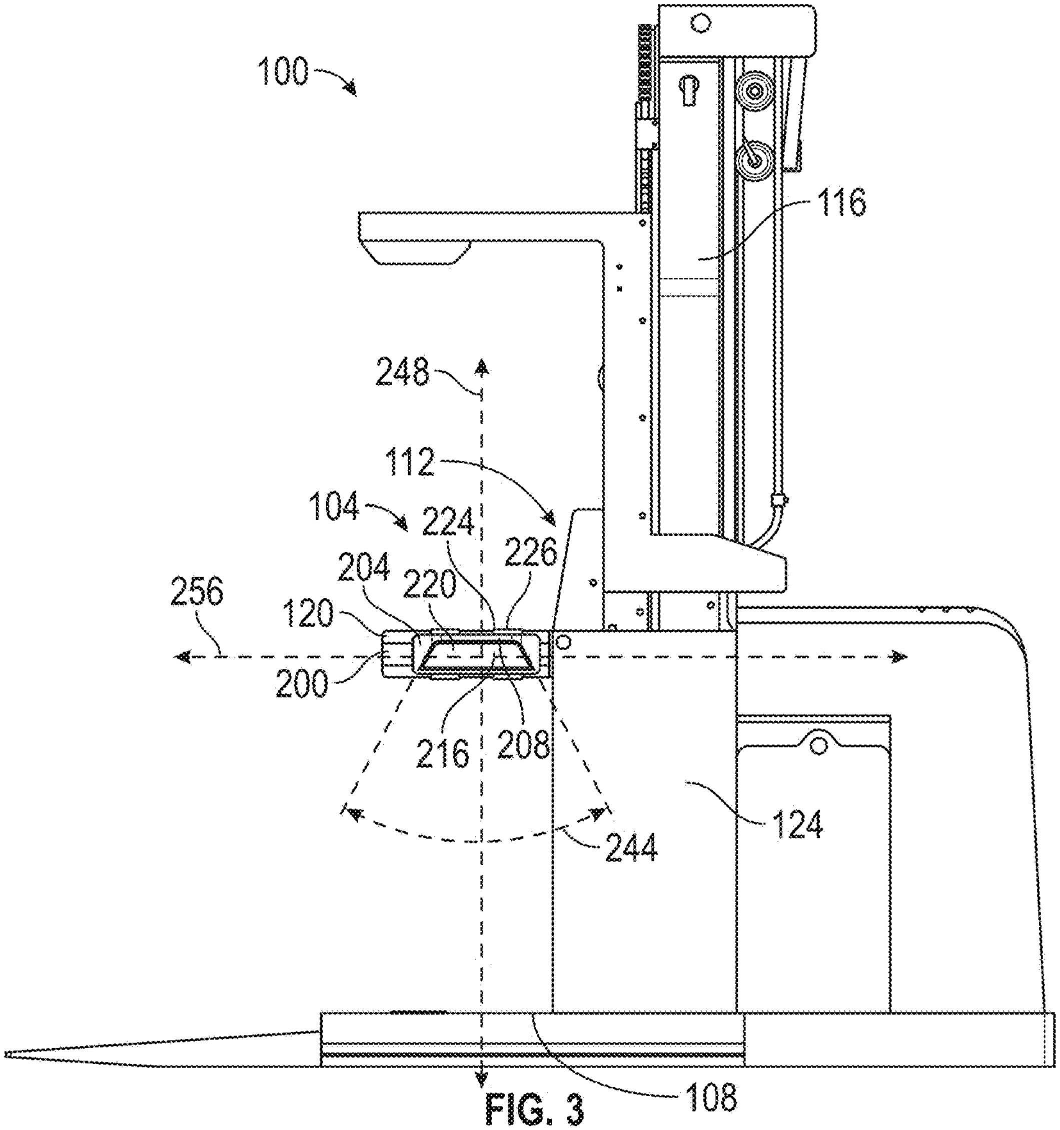
FIG. 3 is a side elevation view of the MHV of FIG. 1, including a lighting accessory of the MHV in a first position.
Figure 4:
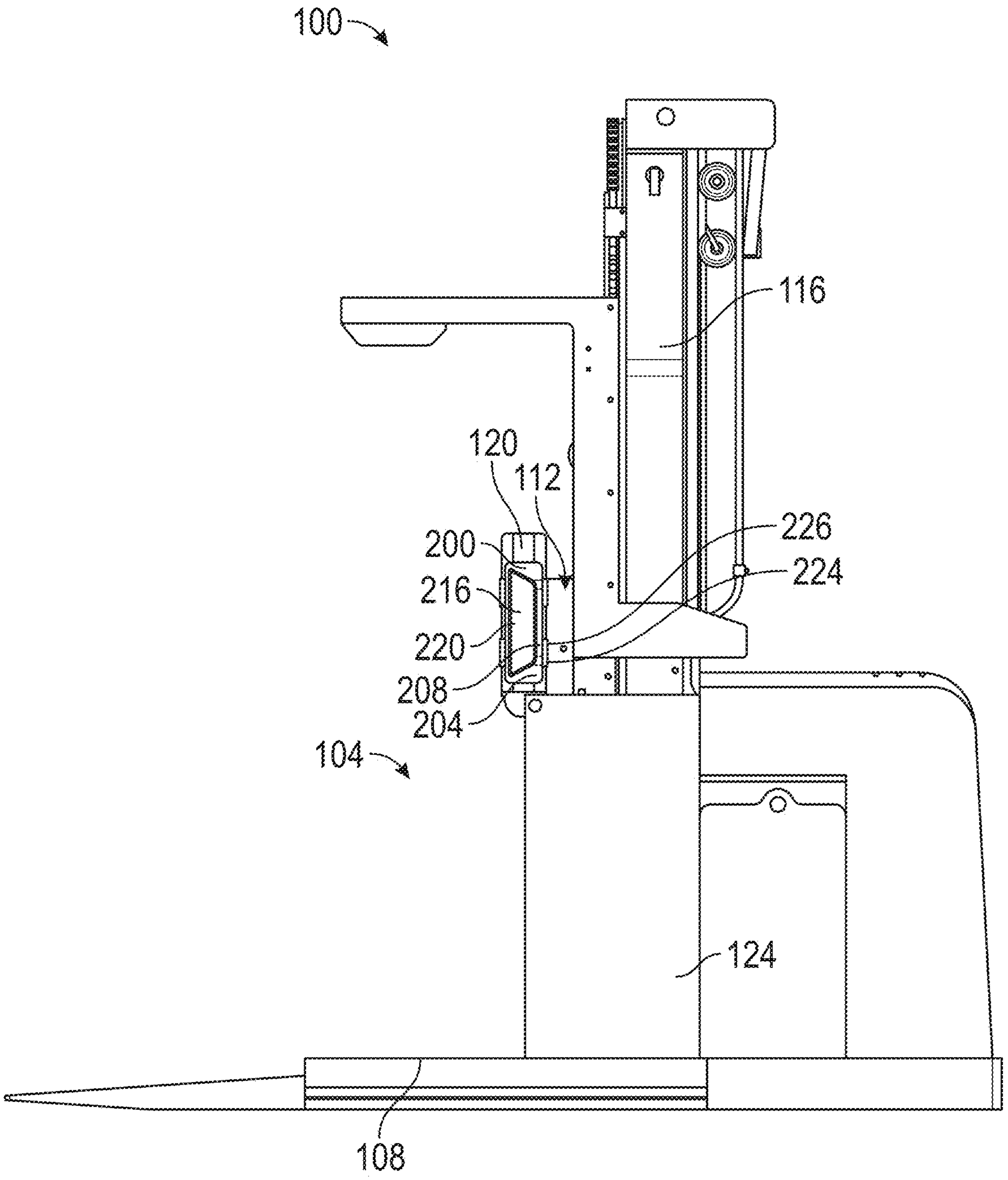
FIG. 4 is a side elevation view of the MHV of FIG. 1, including the lighting accessory of the MHV in a second position.

Referring to FIGS. 3 and 4, as discussed above, the controller 232 may adjust settings of the light source 216 based on a position of the picker arm 120. As illustrated in FIG. 3, when the picker arm 120 is in a first position (e.g., a horizontal position with respect to a ground plane), the controller 232 may activate the light source 216. Furthermore, as illustrated in FIG. 4, when the picker arm 120 is in a second position (e.g., a vertical position with respect to the ground plane), the controller 232 may deactivate the light source 216.

In some implementations, the controller 232 may gradually adjust the intensity or brightness of the light source 216 as the picker arm 120 moves between the first and second positions. For example, the controller 232 may increase the brightness of the light source 216 as the picker arm 120 approaches the first position and decrease the brightness as it moves towards the second position. This gradual adjustment may provide a smooth transition in lighting conditions for the operator. In other examples, the controller 232 may deactivate the light source 216 as soon as the picker arm 120 begins to rotate away from the first position.

In some examples, the controller 232 may also consider other factors in combination with the position of the picker arm 120 when determining whether to activate or deactivate the light source 216. For instance, the controller 232 may take into account the ambient light levels, the speed of the MHV 100, or the location of the MHV 100 within the warehouse. In some cases, the controller 232 may override the default behavior of the lighting accessory 200 (e.g., the controller 232 and the light source 216) based on these additional factors, such as keeping the light source 216 activated even when the picker arm 120 is in the second position if the ambient light levels are particularly low, or deactivating the light source 216 when the picker arm 120 is in the first position and the MHV 100 is moving at a predetermined speed. In other examples, the controller 232 may only override the default behavior based on the additional factors, when the picker arm 120 is in the first position.

The lighting accessory 200 is configured to illuminate shelving and other storage areas to the left and right of the MHV 100 (e.g., perpendicular to a normal forward directional movement of the MHV 100). For example, referring to FIG. 3, the lighting accessory 200 may provide illumination across a horizontal beam angle 244. The horizontal beam angle 244 may be centered along a first plane 248 that extends from a center of the windows 220 and perpendicularly to the ground plane. Furthermore, the first plane 248 may extend perpendicular to the first or second sidewall 212 of the housing 204 or from the surface of the picker arm 120 contacted by the housing 204. The horizontal beam angle 244 may range from about 180 degrees to about 15 degrees, or about 120 degrees to about 15 degrees, or about 90 degrees to about 15 degrees, or about 60 degrees to about 15 degrees. The horizontal beam angle 244 may be determined by the shape of the windows 220, or by a focusing mechanism within the housing 204, which may be designed to direct light across the desired horizontal range.

Figure 5:
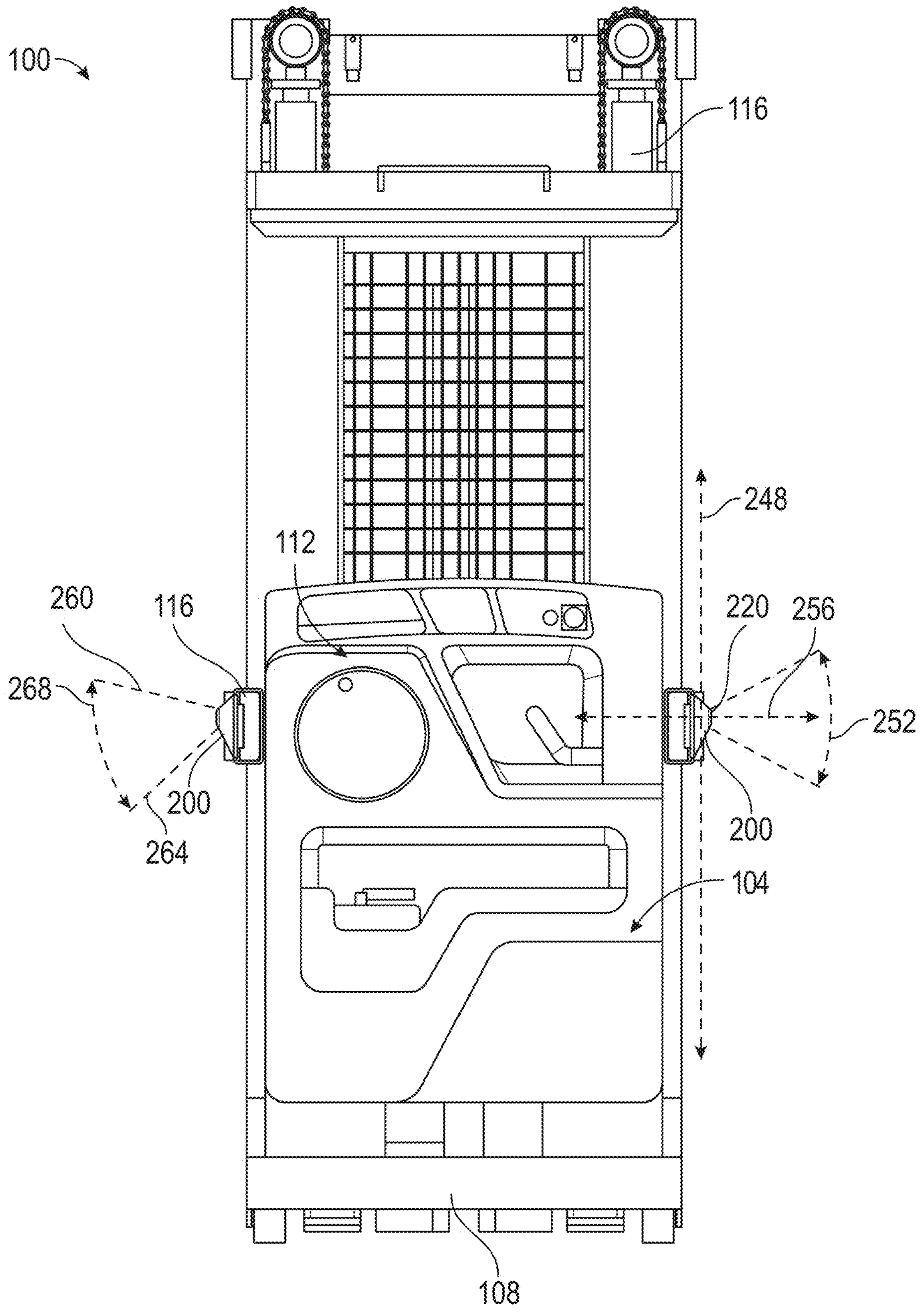
FIG. 5 is a front elevation view of the MHV of FIG. 1, including the lighting accessory in the first position.
Figure 6:
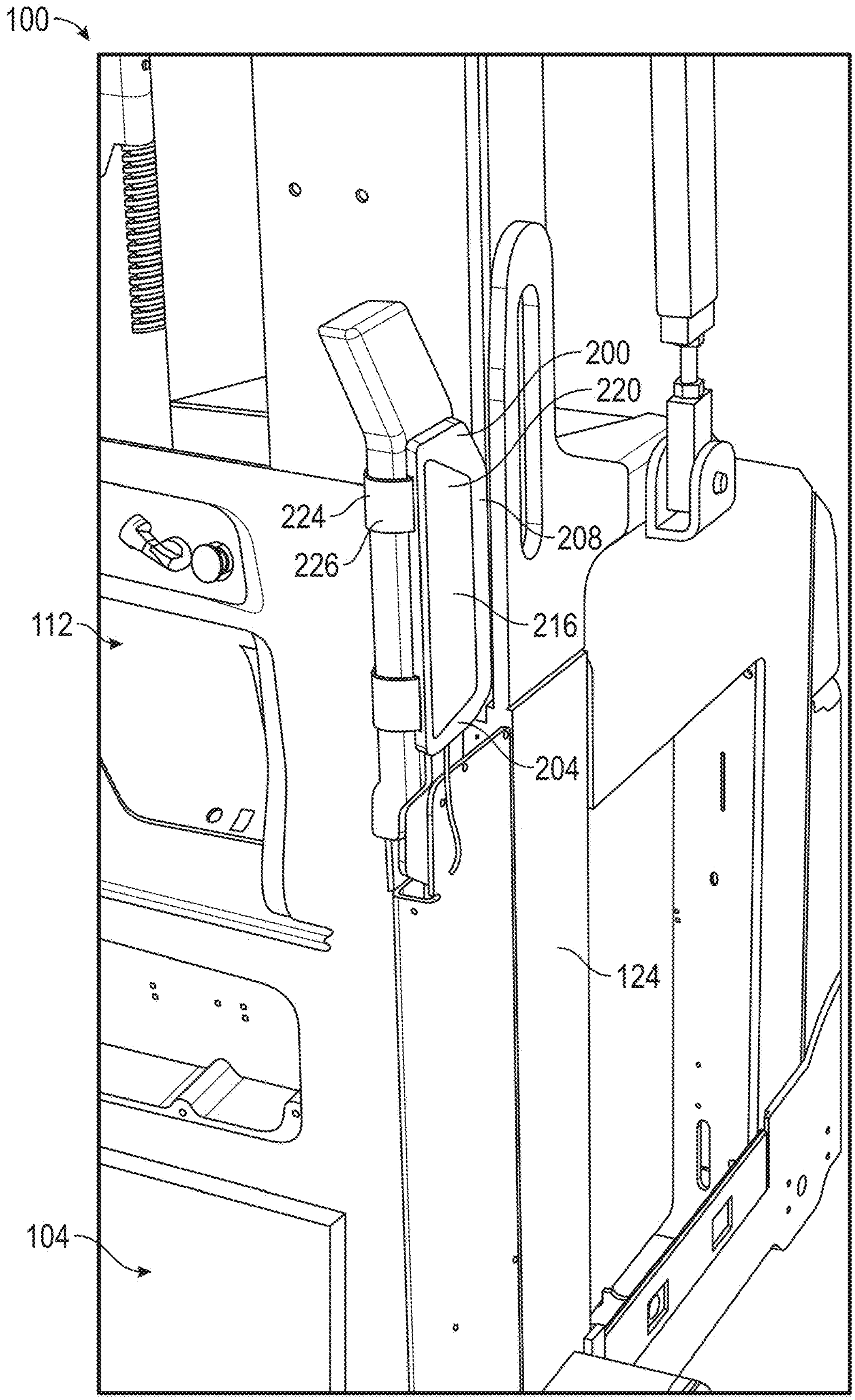
FIG. 6 is a front view of the MHV of FIG. 1, including the lighting accessory of the MHV in the second position.

Referring to FIG. 5, in some examples, the lighting accessory 200 may provide illumination across a vertical beam angle 252. The vertical beam angle 252 may be centered along a second plane 256 that extends from a center of the windows 220 and parallel to the ground plane. Furthermore, the second plane 256 may extend perpendicular to the first or second sidewall 208, 212 of the housing 204 or from the surface of the picker arm 120 contacted by the housing 204. In some examples, the vertical beam angle 252 may extend perpendicular to the horizontal beam angle 244. The vertical beam angle 252 may range from about 180 degrees to about 15 degrees, or about 120 degrees to about 15 degrees, or about 90 degrees to about 15 degrees, or about 60 degrees to about 15 degrees.

In other examples, the vertical beam angle 252 may not be centered about the second plane 256. Instead, the vertical beam angle 252 may define an upper light emission limit 260 and a lower light emission limit 264. The upper light emission limit 260 may extend substantially parallel to the ground plane (e.g., from a top of the windows 220) or may extend obliquely relative to the ground plane. For example, the upper light emission limit 260 may extend between about zero degrees and about 15 degrees or between about zero degrees and 30 degrees or between about zero degrees about 45 degrees from parallel to the ground plane. Furthermore, the lower light emission limit 264 may extend substantially perpendicular to the ground plane or may extend obliquely relative to the ground plane. For example, the lower light emission limit 264 may extend between about zero degrees and about 15 degrees or between about zero degrees and 30 degrees or between about zero degrees about 45 degrees from perpendicular to the ground plane. In some examples, a third beam angle 268 between the upper light emission limit 260 and the lower light emission limit 264 may range from about 120 degrees to about 15 degrees, or about 90 degrees to about 15 degrees, or about 60 degrees to about 15 degrees, or about 45 degrees to about 15 degrees.

The vertical beam angle 252 may be determined by the shape of the windows 220, or by a focusing mechanism within the housing 204, which may be designed to direct light across the desired vertical range. Emitting light along the vertical beam angle 252 may allow the lighting accessory 200 to emit light that is substantially parallel to the ground plane, which may better penetrate shelves and other storage spaces in the operator's working area. The ability to project light horizontally (e.g., parallel to the ground plane) may enhance visibility into deep shelving units or stacked storage areas, potentially improving the operator's ability to locate and retrieve items.

In some examples, the horizontal and vertical beam angles 244, 252 may each be adjustable to allow the lighting accessory 200 to be customized for different warehouse layouts and storage configurations. By tailoring the light distribution of the horizontal beam angle 244 and the vertical beam angle 252, the lighting accessory 200 may provide optimal illumination for various picking tasks and environments.

Figure 7:
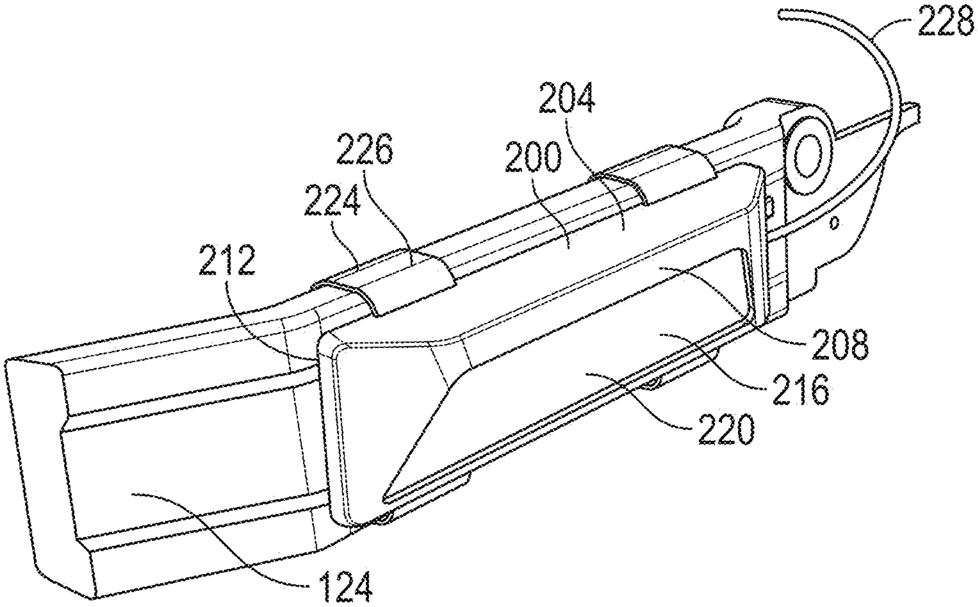
FIG. 7 is a perspective view of the lighting accessory of the MHV of FIG. 1.
Figure 8:
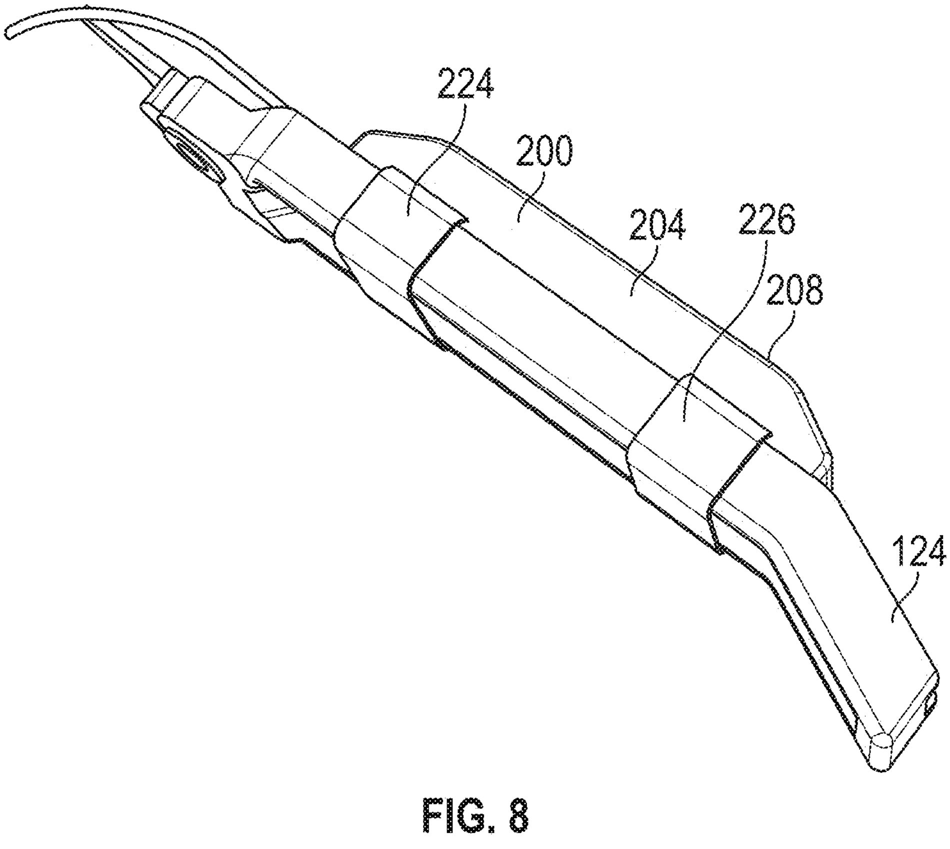
FIG. 8 is a perspective view of the lighting accessory of the MHV of FIG. 1.

Referring to FIGS. 7 and 8, as described above, a shape of the windows 220 may affect characteristics of the lighting accessory 200 including the horizontal and vertical beam angles 244, 252. As illustrated in FIG. 7, when the lighting accessory 200 is installed on the picker arm 120, the first sidewall 208 of the housing 204 may extend substantially parallel to the surface of the picker arm 120 that the first sidewall 208 contacts. In some examples, the window 220, as well as a portion of the second sidewall 212, may be angled obliquely relative to the first sidewall 208. Furthermore, the window 220 may be angled obliquely relative to the ground plane. Angling the window 220 obliquely relative to the first sidewall 208 or the ground plane may affect the vertical beam angle 252 by focusing light emitted through the windows 220 in a specific direction.

Figure 9:
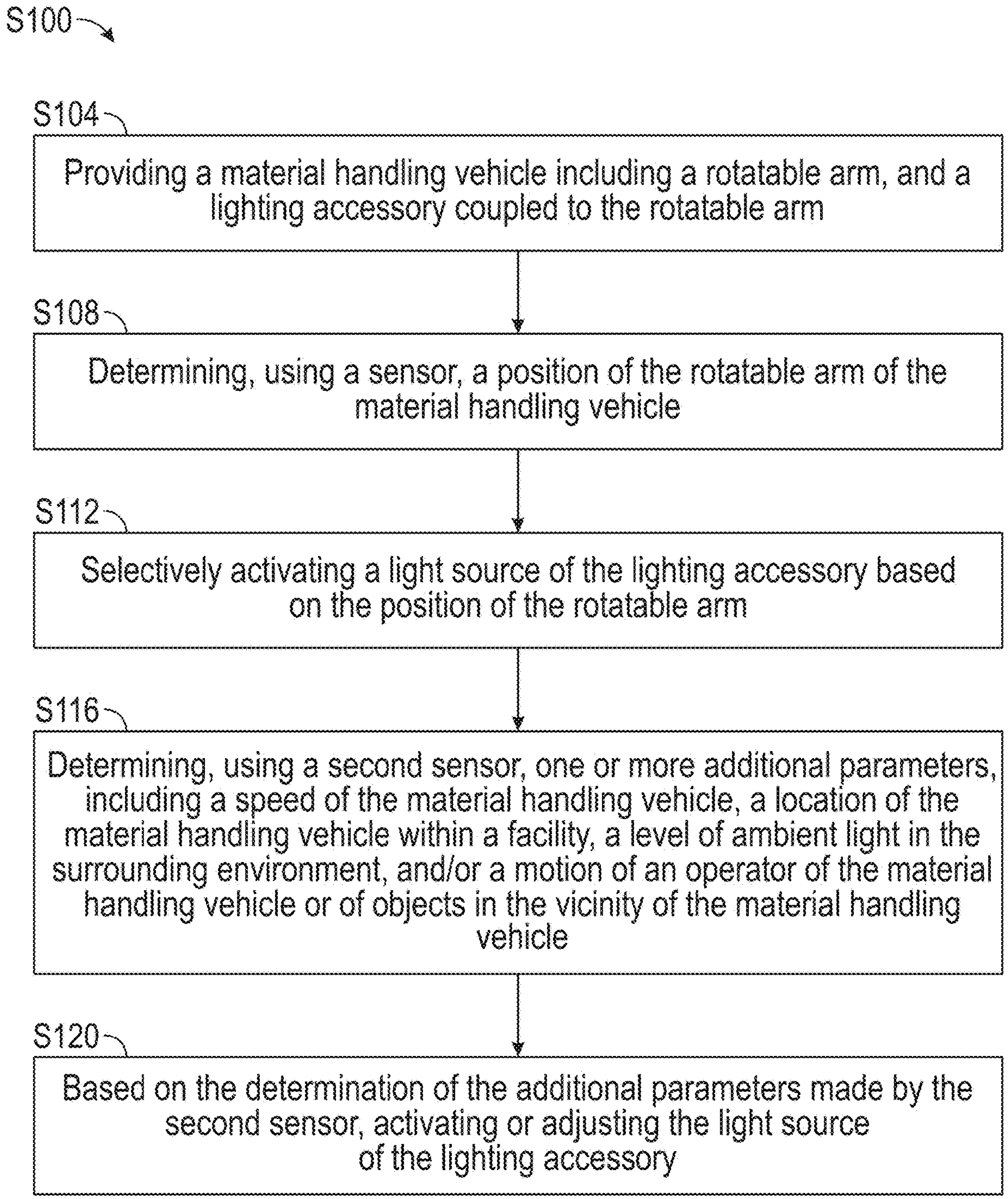
FIG. 9 is a method of using a lighting accessory for a material handling vehicle, according to aspects of the present disclosure.

An exemplary method of utilizing the lighting accessory 200 is illustrated in FIG. 9. The method S100 may include step S104, providing a material handling vehicle including a rotatable arm, and a lighting accessory coupled to the rotatable arm. The method S100 may include step S108, determining, using a sensor, a position of the rotatable arm of the material handling vehicle. The method S100 may include step S112, selectively activating a light source of the lighting accessory based on the sensed position of the rotatable arm. In some implementations, activating the light source may include activating the light source when the rotatable arm is in a substantially horizontal position and deactivating the light source when the rotatable arm is in a substantially vertical position. The method S100 may include step S116, determining, using a second sensor, one or more additional parameters, including a speed of the material handling vehicle, a location of the material handling vehicle within a facility, a level of ambient light in the surrounding environment, or a motion of an operator of the material handling vehicle or of objects in the vicinity of the material handling vehicle. The method S100 may include step S120, based on the determination of the additional parameters made by the second sensor, activating or adjusting the light source of the lighting accessory. This may allow for dynamic control of the lighting accessory in response to various environmental and operational factors, enhancing visibility and efficiency during material handling operations.

An exemplary method of utilizing the lighting accessory 200 is also illustrated in FIG. 10. The method S200 may include step S204, providing a material handling vehicle including a lighting accessory. The lighting accessory may be coupled to a body of the material handling vehicle or may be coupled to a rotatable arm of the material handling vehicle. The method S200 may include step S208, determining using a sensor, one or more parameters, including a position of the rotatable arm, a speed of the material handling vehicle, a location of the material handling vehicle within a facility, a level of ambient light in the surrounding environment, or a motion of an operator of the material handling vehicle or of objects in the vicinity of the material handling vehicle. The method S200 may include step S212, based on the determination of the parameters made by the sensor, activating or adjusting the light source of the lighting accessory by adjusting one or more of a brightness, a beam angle, a color, a flicker frequency, or other applicable settings of the lighting accessory.

Figure 11:
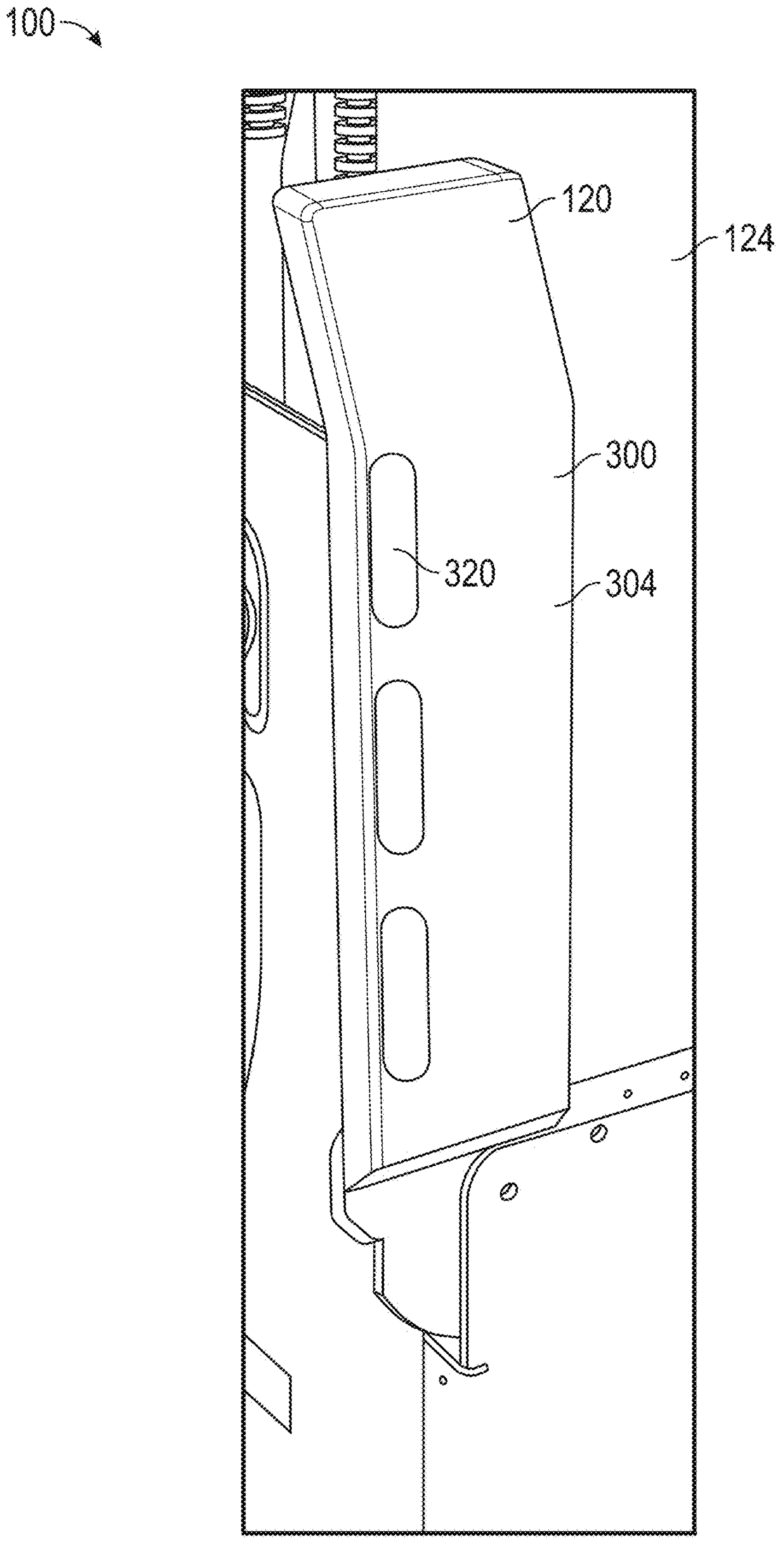
FIG. 11 is a perspective view of a material handling vehicle including a lighting accessory for a material handling vehicle, according to aspects of the present disclosure.

FIG. 11 illustrates another embodiment of a lighting accessory 300. The lighting accessory 300 of FIG. 11 may generally include similar features as the lighting accessory 200 of FIGS. 1-8, including but not limited to a housing 304, windows 320, a light source, a controller, a user interface, a horizontal beam angle, and a vertical beam angle. Thus, discussion of the lighting accessory 200 above also generally applies to similar components of the lighting accessory 300 (and vice versa).

As illustrated in FIG. 11, the housing 304 of the lighting accessory 300 may be coupled to the picker arm 120. Specifically, the housing 304 of the lighting accessory 300 may be integrally formed with the picker arm 120. In such examples, the housing 304 of the lighting accessory 300 may be the picker arm 120. As illustrated in FIG. 8, the windows 320 may also be integrated with the picker arm 120. The integrated design may provide a more streamlined and compact profile for the lighting accessory 300.

Figure 12:
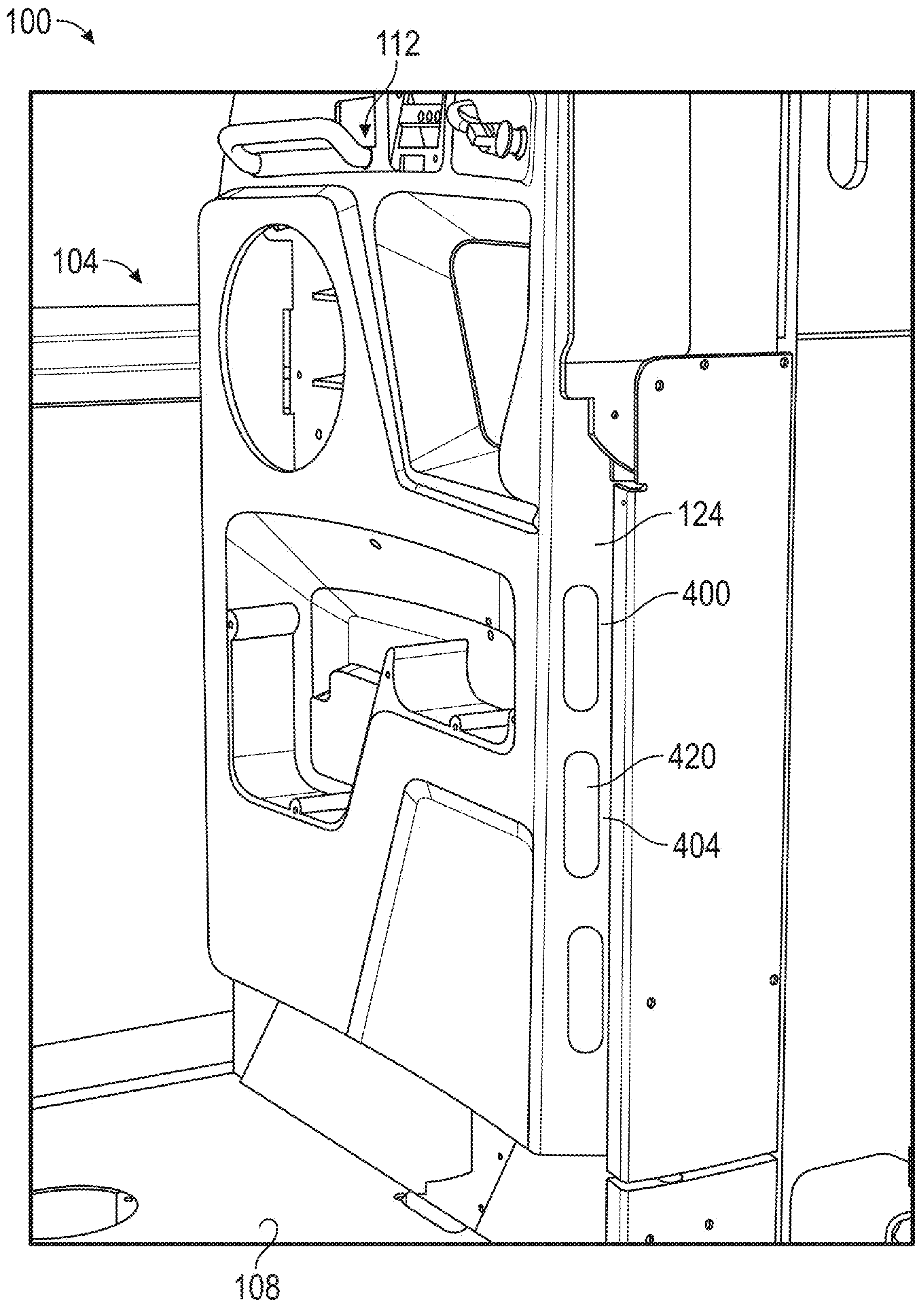
FIG. 12 is a perspective view of a material handling vehicle including a lighting accessory for a material handling vehicle, according to aspects of the present disclosure.

FIG. 12 illustrates another embodiment of a lighting accessory 400. The lighting accessory 400 of FIG. 12 may generally include similar features as the lighting accessory 200 of FIGS. 1-8 and the lighting accessory 300 of FIG. 11, including but not limited to a housing 404, windows 420, a light source, a controller, a user interface, a horizontal beam angle, and a vertical beam angle. Thus, discussion of the lighting accessories 200, 300 above also generally applies to similar components of the lighting accessory 400 (and vice versa).

As illustrated in FIG. 12, the housing 404 of the lighting accessory 400 may be coupled to the body 124 of the MHV 100. Specifically, the housing 404 and thus the lighting accessory 400 may be integrated with the body 124 of the MHV 100 within the operator compartment 104. As illustrated in FIG. 12, the windows 420 may also be integrated with the body of the MHV 100. The integrated design may provide a more streamlined and compact profile for the lighting accessory 400.

In other examples, the housing 404 and thus the lighting accessory may instead be coupled to the body 124 using a fastener.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

It is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, firmware, software, including program instructions executing on a computer, or any combination of thereof. Accordingly, this description is meant to be taken only by way of example, and not to otherwise limit the scope of this invention.

The invention claimed is:

1. A lighting accessory for a material handling vehicle, comprising:
a housing;
a light source disposed within the housing;
a window in the housing configured to allow light from the light source to illuminate a working area adjacent to the material handling vehicle; and
a controller configured to selectively activate the light source based on data collected by a sensor,
wherein light emitted from the light source is projected substantially parallel to a ground plane,
wherein the housing is configured to be coupled to a rotatable arm or a body of the material handling vehicle disposed within or extending at least partially around an operator compartment of the material handling vehicle wherein the sensor is configured to detect a position of the rotatable arm.

2. The lighting accessory of claim 1, wherein the housing is fastened to the rotatable arm of the material handling vehicle by a fastener.

3. The lighting accessory of claim 1, wherein the controller is configured to activate the light source when the rotatable arm is in a first position and deactivate the light source when the rotatable arm is in a second position.

4. The lighting accessory of claim 3, wherein the first position is a horizontal position, and the second position is a vertical position.

5. The lighting accessory of claim 1, wherein light emitted through the window is directed at a horizontal beam angle ranging from about 15 degrees to about 180 degrees, wherein the horizontal beam angle is centered along a plane that extends from a center of the window perpendicular to a ground plane.

6. The lighting accessory of claim 1, wherein light emitted through the window is directed at a vertical beam angle ranging from about 15 degrees to about 180 degrees, wherein the vertical beam angle is centered along a plane that extends from a center of the window parallel to a ground plane.

7. The lighting accessory of claim 1, wherein light emitted through the window is directed at a vertical beam angle defined by an upper light emission limit and a lower light emission limit, wherein the upper light emission limit extends between about zero degrees about 45 degrees from parallel to the ground plane and the lower light emission limit extends between about between about zero degrees about 45 degrees from perpendicular to the ground plane.

8. The lighting accessory of claim 1, wherein the controller is configured to selectively activate the light source based on data collected by a second sensor, and wherein the second sensor is one of a speed sensor, a sensor configured to determine a location of the material handling vehicle, an ambient light sensor, a camera, and a motion sensor.

9. A material handling vehicle, comprising:

a body;

an operator compartment;

a rotatable arm extending at least partially around the operator compartment; and a lighting accessory coupled to the rotatable arm, the lighting accessory including:

a light source configured to emit light substantially parallel to a ground plane;

a sensor; and a controller configured to selectively activate the light source based on data collected by the sensor.

10. The lighting accessory of claim 9, wherein the lighting accessory is integrally formed with the rotatable arm of the material handling vehicle.

11. The material handling vehicle of claim 9, wherein the controller is configured to activate the light source when the rotatable arm is in a substantially horizontal position and deactivate the light source when the rotatable arm is in a substantially vertical position.

12. The material handling vehicle of claim 9, further comprising a sensor configured to detect one or more of a position of the rotatable arm, a speed of the material handling vehicle, a location of the material handling vehicle, a level of ambient light, and a motion of an operator of the material handling vehicle or of objects in an environment of the material handling vehicle.

13. The material handling vehicle of claim 9, wherein the lighting accessory is configured to direct light from the light source at a vertical beam angle defined by an upper light emission limit and a lower light emission limit, wherein the upper light emission limit extends between about zero degrees about 45 degrees from parallel to the ground plane and the lower light emission limit extends between about between about zero degrees about 45 degrees from perpendicular to the ground plane.

14. The material handling vehicle of claim 9, wherein the lighting accessory is configured to direct light from the light source at a horizontal beam angle ranging from about 15 degrees to about 180 degrees, wherein the horizontal beam angle is centered along a plane that extends from a center of the lighting accessory perpendicular to a ground plane.

15. A method of operating a lighting accessory for a material handling vehicle, comprising:

providing the material handling vehicle including a rotatable arm, the lighting accessory coupled the rotatable arm;

determining, using a sensor, a position of the rotatable arm of the material handling vehicle; and selectively activating a light source of the lighting accessory based on the determined position of the rotatable arm.

16. The method of claim 15, wherein activating the light source comprises activating the light source when the rotatable arm is in a substantially horizontal position and deactivating the light source when the rotatable arm is in a substantially vertical position.

17. The method of claim 15, wherein light emitted from the light source is projected substantially parallel to a ground plane.

18. The method of claim 15, further comprising determining, using a second sensor, one or more of a speed of the material handling vehicle, a location of the material handling vehicle, a level of ambient light, and a motion of an operator of the material handling vehicle or of objects in an environment of the material handling vehicle; and selectively activating a light source of the lighting accessory based on the determination of the second sensor.

* * * * *